US008451217B2

United States Patent
LeFort et al.

(10) Patent No.: US 8,451,217 B2
(45) Date of Patent: May 28, 2013

(54) DEVICE FOR CONTROLLING A COMPUTER-BASED POINTER IN A SYSTEM COMPRISING VARIOUS TYPES OF DISPLAYS

(75) Inventors: Marc LeFort, Merignac (FR); Bruno Aymeric, St Medard en Jalles (FR); Denis Bonnet, Bordeaux (FR)

(73) Assignee: Thales, Neuilly-sur-Seine (FR)

( * ) Notice: Subject to any disclaimer, the term of this patent is extended or adjusted under 35 U.S.C. 154(b) by 499 days.

(21) Appl. No.: 12/745,554

(22) PCT Filed: Nov. 27, 2008

(86) PCT No.: PCT/EP2008/066312
§ 371 (c)(1),
(2), (4) Date: Jun. 23, 2010

(87) PCT Pub. No.: WO2009/068601
PCT Pub. Date: Jun. 4, 2009

(65) Prior Publication Data
US 2010/0302147 A1    Dec. 2, 2010

(30) Foreign Application Priority Data

Nov. 30, 2007    (FR) ...................................... 07 08393

(51) Int. Cl.
   *G09G 5/00*    (2006.01)
(52) U.S. Cl.
   USPC ............. 345/156; 345/157; 345/1.1; 345/1.2; 345/160; 715/856; 715/858
(58) Field of Classification Search
   USPC ..... 345/1.1, 1.2, 156, 157, 160; 715/856–858
   See application file for complete search history.

(56) References Cited

U.S. PATENT DOCUMENTS

| 6,219,027 B1* | 4/2001 | Shimizu et al. ............... 715/733 |
| 6,774,886 B2* | 8/2004 | Okuda et al. .................. 345/157 |
| 2002/0075230 A1 | 6/2002 | Okuda et al. |
| 2004/0012562 A1* | 1/2004 | Aymeric ....................... 345/157 |
| 2010/0007800 A1 | 1/2010 | Bonnet |
| 2010/0058116 A1 | 3/2010 | Bonnet et al. |

FOREIGN PATENT DOCUMENTS

WO    02/23322 A1    3/2002

* cited by examiner

*Primary Examiner* — Quan-Zhen Wang
*Assistant Examiner* — Jennifer Nguyen
(74) *Attorney, Agent, or Firm* — Baker & Hostetler, LLP

(57) ABSTRACT

The general field of the invention is that of devices for controlling a computer-based pointer of a computer-based assembly comprising two different computer-based systems, a first secure system comprising at least one first viewing screen and a man-machine interface called CCD controlling the position of the pointer, and a second non-secure system comprising at least one second viewing screen controlled by the same CCD. The control device according to the invention comprises a means called the "CCD manager" belonging to the first system, ensuring the control of the CCD transmission links and comprising the following functions activated when a displacement instruction is transmitted by the user to the CCD, the pointer occupying a first position in the reference plane, determination of the new position of the pointer, determination of the pointer membership area as a function of this new position, authorization of transfer of the displacement instructions coming from the CCD to the secure system or to the open system corresponding to the previously determined membership area.

6 Claims, 4 Drawing Sheets

DEVICE FOR CONTROLLING A COMPUTER-BASED POINTER IN A SYSTEM COMPRISING VARIOUS TYPES OF DISPLAYS

CROSS-REFERENCE TO RELATED APPLICATIONS

This application is a National Stage of International Patent Application No. PCT/EP2008/066312, filed on Nov. 27, 2008, which claims priority to foreign Patent Application No. FR 07/08393, filed on Nov. 30, 2007, the disclosures of which are incorporated herein by reference in their entirety.

FIELD OF THE INVENTION

The field of the invention is that of systems comprising command or control facilities possessing a significant assembly of viewing devices having to display a large amount of information, some of which is vital for the operation or security of the system. The favored field of application is aeronautics, due to the fact that the instrument panels of modern aircraft possess several viewing screens making it possible to display, to control or to modify the information necessary for piloting and navigation. In a general manner, hereinafter in the text, the whole assembly of the secure onboard management system necessary for piloting or navigating an aircraft will be called the "avionics world". The expression "secure onboard management" is understood to mean an electronic and computer-based system comprising means of control, monitoring or redundancy of the information calculated and displayed.

The designation, selection and modification of the displayed information of the "avionics world" is generally performed by control devices of computer mouse type, also called "CCDs", the acronym standing for "Control Cursor Device", which display a control pointer on the viewing screens, this pointer being able to take various forms.

BACKGROUND OF THE INVENTION

Alongside this secure "avionics world", there exists a non-secure "open world" which is able to provide information to the users of the "avionics world". By way of examples, mention is made of the onboard documents management system termed the "Electronic Flight Bag" or the "Internet" links with the outside. This "open world" must be able to be controlled by the same "CCDs" as those used for the "avionics world". In particular, it must be possible with the same "CCD" to easily move the pointer P from a screen 10 of the "avionics world" to a screen 20 or a window of the "open world" as indicated in FIG. 1. The screens of the "open world" and of the "avionics world" are not necessarily differentiated. A large viewing screen can at one and the same time comprise display windows belonging to the "avionics world" and display windows belonging to the "open world". In this figure and in what follows, the coordinates of the pointer P in the "avionics world" are denoted (Xa, Ya), and the coordinates of the pointer in the "open world" are denoted (Xo, Yo). However, this "open world" does not benefit from the same level of computer security as the "avionics world". If no precautions are taken, it is therefore liable to disrupt or disturb the operation of the "avionics world" through the common control of the "CCDs".

To ensure this security, it is necessary that the management of the displacement of the pointer is handled by the "avionics world" in all cases, whether the pointer lies in a window of the "avionics world" or whether it lies in a window of the "open world". This guarantees that the avionics world can take over command of the pointer if it exits the window of the open world, the pointer not having to remain disabled in a window of the open world if the latter behaves in an erroneous manner.

The management of the displacement of the pointer in the "avionics world" is not immediate and depends inter alia:
  on the functions presented on the screen:
    there exist windows where interactivity is prohibited. For example, the screens of "PFD" (Primary Flight Display) type must not comprise any pointers
    there exist windows belonging to the "open world"
  on the configuration of the screens:
    on a screen wall, it is necessary to be capable of passing from one screen to another by continuity.

This complex management can only be ensured by a function that masters the cockpit context. It may not be ensured by the CCD whose electronics and computing are necessarily rudimentary. This complex management is ensured by the avionics system and in particular by the viewing devices. Consequently, in the "avionics world", the CCD works simply in relative coordinates. When the user uses the CCD to move the corresponding pointer on a viewing screen of the "avionics world", the information sent by the CCD is the relative displacements dX and dY performed by the user from an initial position. Electronic means disposed in the viewing screen then calculate, on the basis of the knowledge of its relative displacements dX and dY, the absolute displacements X and Y on the screen proper. Thus, the viewing device can control whether the displacement is authorized, if it entails a change of screen, etc. These things would all be impossible if the CCD worked in absolute coordinates.

Of course, in the "open world", the pointer's display constraints are reduced and, for reasons of speed of display, it is more beneficial for the CCD to work in absolute coordinates X and Y.

When it is necessary to manage a CCD making it possible to move a cursor at one and the same time in the "avionics world" and the "open world", it is therefore necessary to generate relative coordinates destined for the "avionics world" and absolute coordinates destined for the "open world", while preserving the security of the "avionics world".

A first possible solution is presented in FIG. 2. This figure represents the "avionics world" 1, the "open world" 2 and their interconnection. The "avionics world" and the "open world" are represented by dotted rectangles with rounded edges. In this figure, five viewing devices 1 are represented. The two left viewing devices provide information to a first user, generally the captain, and the two right viewing devices provide information to a second user, generally the flight officer. The central viewing device is common to both users. Of course, this number of viewing devices is given only by way of indication. It could be lower or higher. These five devices are interconnected with an avionics bus 3 which ensures the linkup between the viewing devices and the remainder of the avionics world. These viewing devices receive instructions from the two users by means of the two CCDs 4 through a so-called "interactivity" bus 5. The linkup between the "avionics world" and the "open world" is ensured by an "avionics world"-"open world" gateway 6 which, through the "avionics world", controls the "open world" via a one-way gateway. In this configuration, the operation of the CCDs toward the "open world" is as follows:
  sending of the relative coordinates of a CCD to the avionics world,
  calculation of the absolute coordinates of the CCD by the avionics world, retransmission of the coordinates of the CCD to the open world, via the avionics world/open world gateway, recovery of the coordinates of the CCD by the open world, generation of the pointer in the video destined for the screens.

This implementation exhibits a major drawback: the latency of the pointer for the open world is much more significant than the latency of the pointer for the avionics world, and more significant than the maximum latency of 100 milliseconds authorized by the "A661" reference aeronautical standard. In order to decrease the latency of the pointer in the open world, the CCD must work in multi-mode according to the position of the pointer.

SUMMARY OF THE INVENTION

The aim of the device according to the invention is to propose a device for managing the pointer acting differently depending on whether it lies in an avionics window or in a window of the open world, the CCD necessarily forming part of the avionics world for security reasons. This device guarantees:

the security of the avionics world; the open world cannot pollute the avionics world, the optimization of the latency between the action on the CCD and the viewing of the displacement of the pointer for the avionics world and the open world.

Consequently, the avionics world must manage the coordinates of the pointer in relative mode destined for the avionics world and in absolute mode destined for the open world.

The principle of the device according to the invention is to make the CCD work in two modes which will be piloted by an intelligent facility of the avionics world that is called the "CCD manager":

$1^{st}$ mode: the pointer is in an avionics window and the CCD generates relative coordinates for the CCD manager $2^{nd}$ mode: the pointer is in a window of the open world and the CCD generates absolute coordinates for the open world via a direct link to the open world.

The major benefit of this solution is that the link from the CCD to the "open world" is a unidirectional link not requiring any computer-based firewall.

One of the major problems in introducing "open world" applications into a civilian cockpit is the risk of the pilot being diverted from critical tasks such as piloting, for example, by incorrect or malicious operation of these applications. Concerning the cursor, an obvious problem is the risk of seeing two cursors appear, that is to say the "open world" continues to display a cursor although it theoretically no longer has the right to do so, the cursor being in the avionics world again. The proposed solution makes it possible to afford a satisfactory response to this problem. When the cursor is in the avionics world, the CCD no longer sends the screen coordinates to the open world. Thus, the "open world" is incapable of simulating, by malfunction or maliciousness, a cursor motion consistent with the real movements of the CCD. In the case where two cursors are displayed, as soon as the pilot touches the CCD, the avionics cursor alone will therefore be able to move in a consistent manner: it alone receives the information about real movement coming from the CCD.

More precisely, the subject of the invention is a device for controlling a computer-based pointer of a computer-based assembly comprising two computer-based systems, the first system called a secure system comprising at least one viewing screen, a man-machine interface called CCD, said CCD comprising a first bi-directional link for transmitting the displacement instructions originating from a user to said secure system and means for displaying said computer-based pointer on said screen, said displacement instructions being referenced in a plane termed the reference plane;

the second system called an open system comprising at least one viewing screen, the CCD comprising a second link for transmitting the displacement instructions originating from a user to said open system and means for displaying said computer-based pointer on said screen, the display area occupying an area termed the open area in the reference plane;

characterized in that the control device comprises a means called the "CCD manager" belonging to the first system, ensuring the control of the CCD transmission links and comprising the following functions activated when a displacement instruction is transmitted by the user to the CCD, the pointer occupying a first position in the reference plane, determination of the new position of the pointer, determination of the pointer membership area as a function of this new position, authorization of transfer of the displacement instructions coming from the CCD to the secure system or to the open system corresponding to the previously determined membership area.

Preferably, when a displacement instruction is transmitted by the user to the CCD, the displacement instructions are provided initially to the secure system as relative coordinates with respect to the position previously occupied by the pointer and the displacement instructions are provided to the open system as absolute coordinates.

Moreover, during the transitions of the pointer from a viewing device of one system to a viewing device of the other system, the "CCD manager" generates an effect perceptible by the user, indicating thereto that there is transition from one system to the other.

Advantageously, the device is an aeronautical flight management system, the viewing screens belonging to the instrument panel.

BRIEF DESCRIPTION OF THE DRAWINGS

The invention will be better understood and other advantages will become apparent on reading the nonlimiting description which follows and by virtue of the appended figures among which.

DETAILED DESCRIPTION

In what follows, the system described is more specifically a flight management system. But, of course, the invention can be applied without particular difficulties to any computer-based system comprising secure and non-secure display means.

Figure 1:
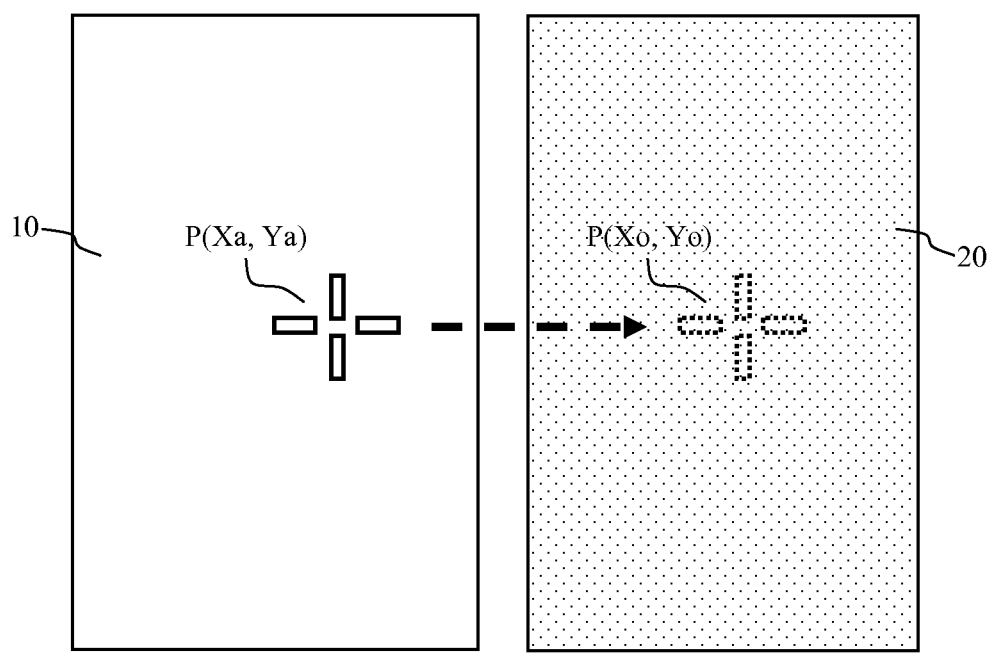
FIG. 1 previously described represents the symbolic passage of a cursor from an avionics world to an open world.
Figure 2:
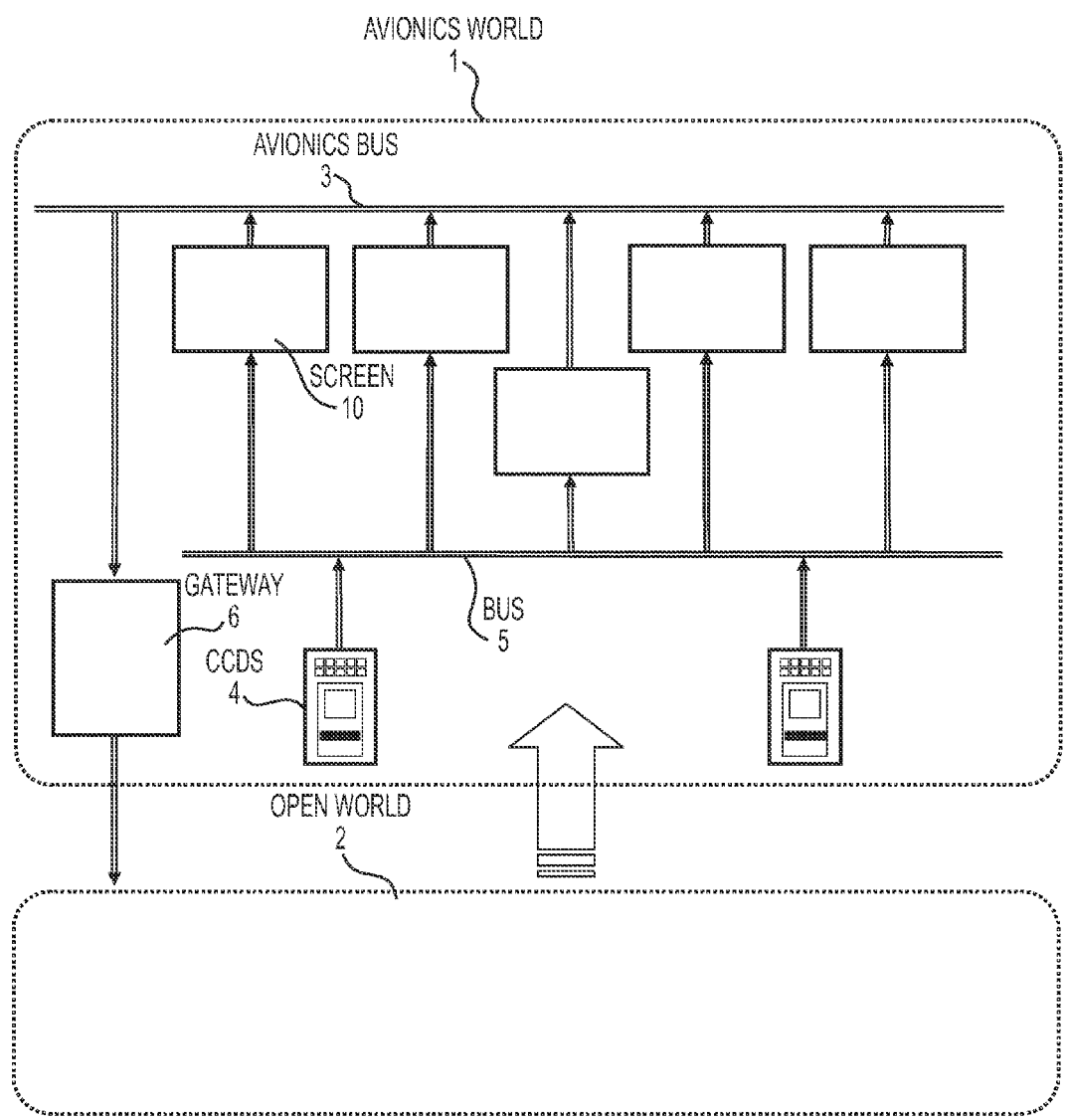
FIG. 2 previously described represents the "avionics world", the "open world" and their secure interconnection such as it is effected in the prior art.
Figure 3:
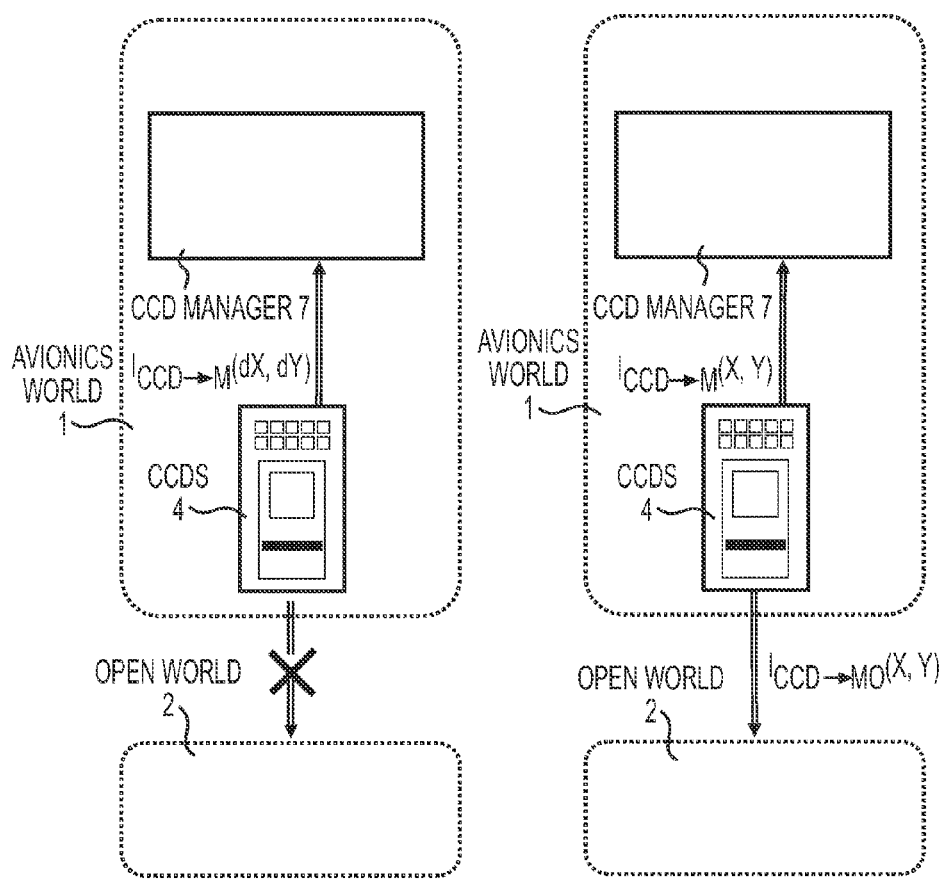
FIG. 3 represents the two modes of operation of the CCD according to the invention depending on whether the cursor is in the avionics world or the open world.

FIG. 3 represents the two operating modes of a CCD according to the invention. On the left view, the CCD sends the pointer control instructions to the avionics world. In this figure and on the following one, the following conventions have been adopted:

the instructions or the data provided by the CCD to the "CCD manager" are denoted $I_{CCD \to M}$, the instructions or the data provided by the CCD to the "open world" are denoted $I_{CCD \to MO}$, the instructions or the data provided by the "CCD manager" to the CCD are denoted $I_{M \to CCD}$, the instructions or the data provided by the "CCD manager" to the "avionics world" are denoted $I_{M \to MA}$.

The displacement instructions $I_{CCD \to M}$ are provided to the avionics system by way of a management device called the "CCD manager" 7 as relative coordinates dX, dY with respect to the position previously occupied by the pointer. Of course, these relative coordinates are thereafter transformed into absolute coordinates by the display means of the viewing screen on which the pointer is displayed. The link of the CCD with the open world 2 is interrupted.

In the right view of FIG. 3, the CCD sends the pointer control instructions to the open world 2. The displacement instructions $I_{CCD \to MO}$ are provided to the open world and to the "CCD manager" as absolute coordinates Xo, Yo.

More precisely and by way of nonlimiting example, the algorithm below represents the various steps of the management of the pointer by the multi-mode CCD. This algorithm comprises comments in italics between parentheses. The notation adopted for the coordinates occurring in the algorithm are as follows:

absolute coordinates of the position of the pointer transmitted to the "open world": Xo, Yo, absolute coordinates of the position of the pointer transmitted to the "avionics world": Xa, Ya, relative coordinates of the position of the pointer transmitted to the "manager": dX, dY, absolute coordinates of the position of the pointer transmitted to the "CCD" by the "CCD manager": X1, Y1, absolute coordinates of the position of the pointer transmitted to the "CCD manager" by the "CCD": X2, Y2, coordinates of the limits of the window of the open world: Xmin, Xmax, Ymin, Ymax.

CCD Management Algorithm

Determination of dX and of dY (coordinates provided by the man-machine interface of the CCD)

If mode="pointer in a window of the avionics world"

Open world pointer authorization=False (Cutting of communications with the open world)

Xo=Yo=−1 (or any other value allowing off-screen "frozen" positioning)

X2=X1

Y2=Y1

Else (mode="pointer in a window of the open world")

If avionics mode to open world transition

"Initialization of the pointer"

Xo=X1 and X2=X1

Yo=Y1 and Y2=Y1

Open world pointer authorization=True

Else

"Steady regime"

Xo=Xo_previous+dX

Yo=Yo_previous+dY

Limitation of Xo between Xmin and Xmax (corresponding to the limits in X of the window of the open world)

Limitation of Yo between Ymin and Ymax (corresponding to the limits in Y of the window of the open world)

Open world pointer authorization=True

X2=Xo

Y2=Yo

Endif (End-of-processing indication)

Endif (End-of-processing indication)

Figure 4:
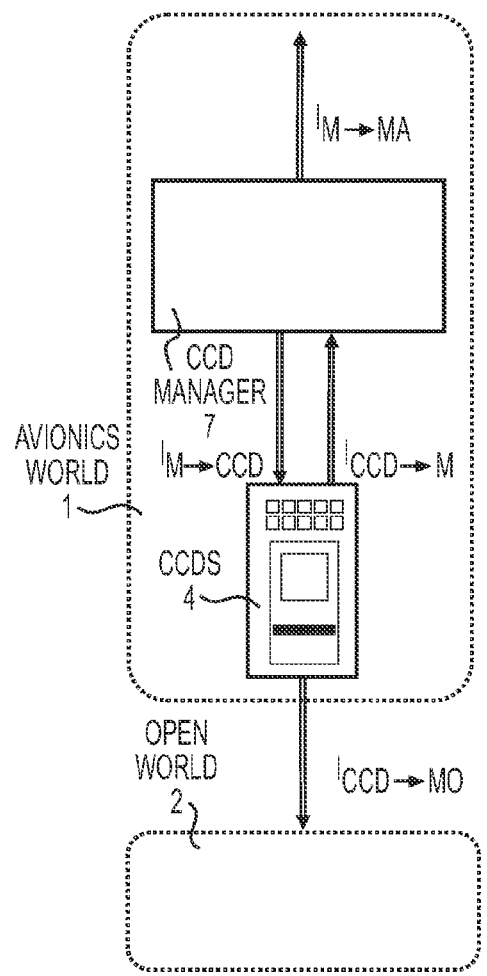
FIG. 4 represents the operation of the "CCD manager" according to the invention.

Sending of dX, dY, X2, Y2 and Open world pointer authorization to the avionics world Sending of Xo, Yo and Open world pointer authorization to the open world FIG. 4 represents the operation of the "CCD manager" according to the invention. The "CCD manager" ensures the control of the CCD transmission links and comprises the following $I_{M \to CCD}$ and $I_{M \to MA}$ instructions activated when a displacement instruction is transmitted by the user to the CCD, the pointer occupying a first position in the reference plane, determination of the new position of the pointer, determination of the pointer membership area as a function of this new position, authorization of transfer of the displacement instructions coming from the CCD to the secure system or to the open system corresponding to the previously determined membership area.

The functions of the "CCD manager" are simple and can be easily installed in various systems belonging to the "avionics world".

More precisely and by way of nonlimiting example, the algorithm below represents the various steps of the management of the CCD by the CCD manager with comments in italics between parentheses. The notation is that previously set out:

CCD Manager Management Algorithm

Determination of the mode as a function of the position of the pointer, of dX and dY and of the resistance effect that one wishes to give in order to pass from one world to another If mode="pointer in a window of the avionics world"

Calculation of the absolute coordinates of the avionics pointer (Xa and Ya):

Xa=Xa_previous+dX

Ya=Ya_previous+dY

Avionics world pointer authorization=True

Update pointer coordinates for CCD:

X1=Xa

Y1=Ya

Initialization of Xmin, Xmax, Ymin, Ymax to the window of the screen

Else (mode="pointer in a window of the open world")

Determination of the coordinates of the open world window (Xmin, Xmax, Ymin and Ymax)

Avionics world pointer authorization=False

If Open world pointer authorization=False (avionics world to open world transition)

"Initialization of variables"

Freezing of X1 and Y1 (on the boundary of the window)

Else (Open world pointer authorization=True→"Steady regime")

X1=X2

Y1=Y2

Endif (End-of-processing indication)

Endif (End-of-processing indication)

Sending of X1, Y1, Xmin, Xmax, Ymin, Ymax and mode to the CCD

The invention claimed is:

1. A device for controlling a computer-based pointer of a computer-based assembly, comprising:

two computer-based systems, including:
- a first secure system comprising at least one viewing screen, a man-machine interface called Control Cursor Device, said Control Cursor Device comprising a first bi-directional link for transmitting the displacement instructions originating from a user to said secure system and means for displaying said computer-based pointer on said screen, said displacement instructions being referenced in a plane termed the reference plane; and
- a second open system comprising at least one viewing screen, the Control Cursor Device comprising a second link for transmitting the displacement instructions originating from a user to said open system and means for displaying said computer-based pointer on said screen, the display area occupying an area termed the open area in the reference plane;

wherein the control device comprises a Control Cursor Device manager belonging to the first system, ensuring the control of the Control Cursor Device transmission links and comprising a plurality of functions activated when a displacement instruction is transmitted by the user to the Control Cursor Device, the pointer occupying a first position in the reference plane, the plurality of functions including:
- determination of the new position of the pointer;
- determination of the pointer membership area as a function of this new position, and
- authorization of transfer of the displacement instructions coming from the Control Cursor Device to the secure system or to the open system corresponding to the previously determined membership area.

2. The control device as claimed in claim 1, wherein, when a displacement instruction is transmitted by the user to the Control Cursor Device, the displacement instructions are provided initially to the secure system as relative coordinates with respect to the position previously occupied by the pointer and the displacement instructions are provided to the open system as absolute coordinates.

3. The control device as claimed in claim 1, wherein, during the transitions of the pointer from a viewing device of one system to a viewing device of the other system, the Control Cursor Device manager generates an effect perceptible by the user, indicating thereto that there is transition from one system to the other.

4. The control device as claimed in characterized in that claim 1, wherein said device is an aeronautical flight management system, the viewing screens belonging to the instrument panel.

5. The control device as claimed in claim 4, wherein, when a displacement instruction is transmitted by the user to the Control Cursor Device, the displacement instructions are provided initially to the secure system as relative coordinates with respect to the position previously occupied by the pointer and the displacement instructions are provided to the open system as absolute coordinates.

6. The control device as claimed in claim 4, wherein, during the transitions of the pointer from a viewing device of one system to a viewing device of the other system, the Control Cursor Device manager generates an effect perceptible by the user, indicating thereto that there is transition from one system to the other.

* * * * *